US010845605B2

(12) United States Patent
Tzvieli et al.

(10) Patent No.: US 10,845,605 B2
(45) Date of Patent: Nov. 24, 2020

(54) HEAD-MOUNTED DISPLAY HAVING AN INFLATABLE AIRBAG

(71) Applicant: Facense Ltd., Kiryat Tivon (IL)

(72) Inventors: Arie Tzvieli, Berkeley, CA (US); Gil Thieberger, Kiryat Tivon (IL); Ari M Frank, Haifa (IL)

(73) Assignee: Facense Ltd., Kiryat Tivon (IL)

( * ) Notice: Subject to any disclaimer, the term of this patent is extended or adjusted under 35 U.S.C. 154(b) by 0 days.

(21) Appl. No.: 16/710,300

(22) Filed: Dec. 11, 2019

(65) Prior Publication Data

US 2020/0117013 A1    Apr. 16, 2020

Related U.S. Application Data

(63) Continuation of application No. 16/517,583, filed on Jul. 20, 2019, now Pat. No. 10,551,623.

(Continued)

(51) Int. Cl.
*G02B 27/01* (2006.01)
*B60Q 9/00* (2006.01)
*B60R 1/00* (2006.01)

(52) U.S. Cl.
CPC ......... *G02B 27/0176* (2013.01); *B60Q 9/008* (2013.01); *B60R 1/00* (2013.01); *G02B 27/0172* (2013.01); *B60R 2300/205* (2013.01)

(58) Field of Classification Search
CPC ..... B60Q 9/008; B60R 1/00; B60R 2300/205; B60R 2021/0048; B60R 2021/0213; B60R 2021/0253; B60R 2021/0293; B60R 21/02; B60R 21/214; G02B 27/0172; G02B 27/0176; G02B 27/017; B32B 1/02; B32B 2307/31; B32B 2307/7242; B32B 2307/748; B32B 2439/46; B32B 2439/70; B32B 27/08; B32B 27/306; B32B 27/32;
(Continued)

(56) References Cited

U.S. PATENT DOCUMENTS 4,651,951 A * 3/1987 McFarlane ............. A42B 3/042
 244/1 R
5,472,231 A * 12/1995 France ..................... B60R 21/18
 280/733

(Continued)

FOREIGN PATENT DOCUMENTS

DE        10137804 A1    2/2003
DE    102015007387 A1   12/2016
(Continued)

*Primary Examiner* — Richard J Hong
(74) *Attorney, Agent, or Firm* — Active Knowledge Ltd.

(57) ABSTRACT

Head-mounted displays (HMDs) are being used more and more for entertainment and work while traveling in vehicles. However, the use of an HMD can be risky in the event of a collision. This disclosure describes a safety system comprising a head-mounted display (HMD) configured to be worn on a passenger's head while traveling in an automated on-road vehicle, a folded airbag, fixed to the HMD, and an inflation system fixed to the vehicle and connected to the folded airbag through a flexible hose. The flexible hose is configured to convey as generated by the inflation system. The system may further detach the flexible hose from the inflation system after the inflation, such that the airbag is no longer connected to the inflation system shortly after the inflation.

13 Claims, 12 Drawing Sheets

Related U.S. Application Data

(60) Provisional application No. 62/701,499, filed on Jul. 20, 2018.

(58) Field of Classification Search
CPC ......... B32B 27/34; B32B 27/36; B32B 3/266; B32B 3/30; B32B 7/02; B32B 7/05; B32B 7/06; B32B 7/14; A42B 3/042
See application file for complete search history.

(56) References Cited

U.S. PATENT DOCUMENTS

| | | |
|---|---|---|
| 9,988,008 B2 | 6/2018 | Thieberger et al. |
| 10,059,347 B2 | 8/2018 | Thieberger-Navon et al. |
| 2003/0019018 A1 | 1/2003 | Markovitz |
| 2006/0053556 A1 | 3/2006 | Piontek |
| 2006/0218705 A1 | 10/2006 | Chiang |
| 2007/0033718 A1 | 2/2007 | Lin |
| 2009/0192710 A1 | 7/2009 | Eidehall et al. |
| 2009/0292468 A1 | 11/2009 | Wu et al. |
| 2009/0313746 A1 | 12/2009 | Wang |
| 2012/0242694 A1 | 9/2012 | Hotta et al. |
| 2013/0026803 A1* | 1/2013 | Islam ............... B64D 11/06205 297/216.13 |
| 2013/0030686 A1 | 1/2013 | Morotomi et al. |
| 2015/0100179 A1 | 4/2015 | Alaniz et al. |
| 2015/0294505 A1 | 10/2015 | Atsmon |
| 2015/0316773 A1 | 11/2015 | Tazbaz et al. |
| 2017/0090514 A1 | 3/2017 | Byun et al. |
| 2017/0217431 A1 | 8/2017 | Class et al. |
| 2018/0012074 A1 | 1/2018 | Holz et al. |
| 2018/0052005 A1 | 2/2018 | Schilling et al. |
| 2018/0141544 A1 | 5/2018 | Xiao et al. |
| 2018/0141545 A1 | 5/2018 | Freytag |
| 2018/0210492 A1 | 7/2018 | Chen et al. |
| 2018/0239151 A1 | 8/2018 | Chang et al. |
| 2019/0056601 A1* | 2/2019 | Lee ........................ G02C 5/143 |
| 2019/0167095 A1* | 6/2019 | Krueger ................. A61B 3/112 |
| 2019/0250651 A1* | 8/2019 | Liu ................... G02B 27/0176 |

FOREIGN PATENT DOCUMENTS

| | | | |
|---|---|---|---|
| DE | 102017214296 B3 | 7/2018 | |
| DE | 102017207608 A1 | 11/2018 | |
| KR | 20060018319 A | 3/2006 | |
| WO | WO-03013912 A1 * | 2/2003 | ............. G02C 5/001 |
| WO | WO03013912 A1 | 2/2003 | |
| WO | WO2003013912 A1 | 2/2003 | |
| WO | WO-2014082023 A1 * | 5/2014 | ........... G02B 27/017 |

* cited by examiner

HEAD-MOUNTED DISPLAY HAVING AN INFLATABLE AIRBAG

CROSS-REFERENCE TO RELATED APPLICATIONS

This Application is a Continuation of U.S. application Ser. No. 16/517,583, filed Jul. 20, 2019, which claims priority to U.S. Provisional Patent Application No. 62/701,499, filed Jul. 20, 2018.

ACKNOWLEDGMENTS

Gil Thieberger would like to thank his holy and beloved teacher, Lama Dvora-hla, for her extraordinary teachings and manifestation of wisdom, love, compassion and morality, and for her endless efforts, support, and skills in guiding him and others on their paths to freedom and ultimate happiness. Gil would also like to thank his beloved parents for raising him with love and care.

TECHNICAL FIELD

This application relates to dismantling automatically a head-mounted display from the head of a passenger who travels in an automated on-road vehicle.

BACKGROUND

Head-mounted displays (HMDs) are being used more and more for entertainment and work while traveling in vehicles. For example, virtual reality can turn a dreary commute into an exhilarating adventure. However, wearing an HMD in a vehicle can pose a safety risk in the event of a collision. For example, wearing a heavy HMD during collision can cause a whiplash because of the extra weight of the HMD that is added to the head. In order to realize the potential of using HMDs in vehicles, there is a need to address the safety issues such use may pose.

SUMMARY

In order to reduce the severity of whiplash during collision, there is a need to reduce as much as possible the extra weight on the head and neck. This disclosure describes various embodiments of HMDs, which may be used in automated on-road vehicles. In an event that a collision is imminent, e.g., as indicated by an Advanced Driver-Assistance System (ADAS), an airbag fixed to the HMD is inflated by an inflation system fixed to the vehicle instead of being fixed to the HMD. By removing at least some of the weight of the inflation system from the passenger's head to the vehicle cabin, the severity of a possible whiplash during collision is reduced.

Some embodiments of a safety system described herein includes a head-mounted display (HMD) configured to be worn on a passenger's head while traveling in an automated on-road vehicle; a folded airbag fixed to the HMD; and an inflation system fixed to the vehicle, and connected to the folded airbag through a flexible hose configured to convey as generated by the inflation system. Optionally, the system is further configured to disconnect the flexible hose following the inflation of the airbag. And optionally, the system is further configured to detach the flexible hose from the inflation system after inflation such that the airbag is no longer connected to the inflation system shortly after the inflation.

BRIEF DESCRIPTION OF THE DRAWINGS

The embodiments are herein described by way of example only, with reference to the following drawings.

DETAILED DESCRIPTION

Figure 1A:
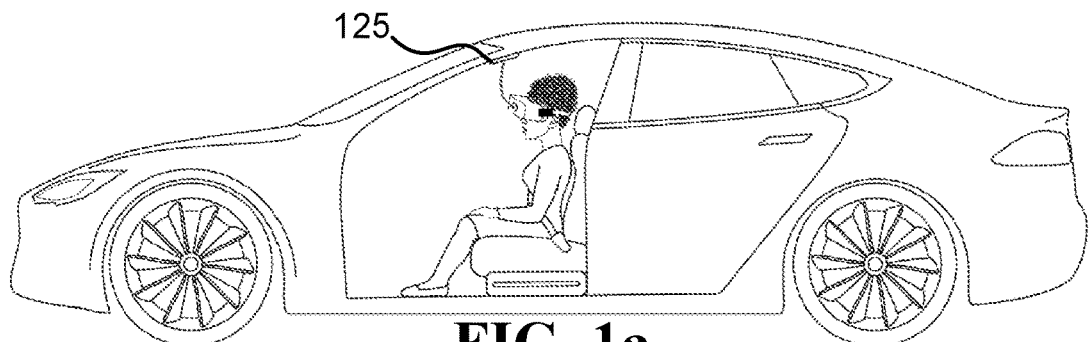
FIG. 1a to FIG. 1d illustrate one embodiment in which a head-mounted display (HMD) worn by a passenger in a vehicle is dismantled and its display module is stored near the ceiling of the vehicle.

The following are definitions of various terms that may be used to describe one or more of the embodiments in this disclosure.

The term "automated driving system" as used herein refers to a Level 2 and higher Levels of autonomous driving (Level3, Level 4, and/or Level 5), such as defined in SAE J30162_01609 "Taxonomy and Definitions for Terms Related to Driving Automation Systems for On-Road Motor Vehicles". "Automated driving system" also refers to any kind of autonomous driving system for vehicles that will be developed in the future. Examples of automated driving system include Advanced Driver-Assistance Systems (ADAS) from manufacturers such as: Tesla, Mobileye, NVIDIA, Autoliv, Continental, Delphi, and Denso.

The term "automated on-road vehicle" as used herein refers to cars and/or motorcycles designed to drive on public roadways utilizing automated driving of level 2 and above according to SAE J3016_201609. The term "automated on-road vehicle" does not include trains, airplanes, boats, and armored fighting vehicles.

Automated driving systems usually use algorithms such as machine learning, pattern recognition, neural network, machine vision, artificial intelligence, and/or probabilistic logic to calculate probability of an imminent collision. The term "calculate probability of an imminent collision" also refers to "calculate values indicative of probability of an imminent collision", from which it is possible to estimate the probability of the imminent collision. The algorithms usually receive as inputs the trajectory of the vehicle, measured locations of at least one nearby vehicle, information about the road, and/or information about environmental conditions. Calculating the probability of an imminent collision is known in the art, both for human driven vehicles and autonomous vehicles, and is widely used in Advanced Driver-Assistance Systems (ADAS). For example, the following US Patent Applications describe driver-assistance systems that calculate probability of an imminent collision: US 2017/0217431, US 2009/0292468, US 2018/0052005, US 2018/0141545, US 2018/0141544, US 2009/0192710, U.S. Pat. No. 8,868,325, and US 2013/0030686.

An element "fixed to the vehicle" may be connected to any relevant part of the vehicle, whether inside the vehicle, outside the vehicle, to the front, back, top, bottom, and/or to a side of the vehicle.

The term "display" refers herein to any device that provides video to a human user. The video provided by the display may be two-dimensional video or three-dimensional video. Some non-limiting examples of displays that may be used in embodiments described in this disclosure include: (i) screens and/or video displays of various devices (e.g., televisions, computer monitors, tablets, smartphones, or smartwatches), (ii) headset displays such as augmented-reality systems (e.g., Vuzix Blade), virtual-reality systems (e.g., Oculus rift, HTC Vive, Samsung GearVR), and mixed-reality systems (e.g., Microsoft® Hololens™, Magic Leap), and (iii) image projection systems that project video on the user's retina, such as: Virtual Retinal Displays (VRD) that create images by projecting low power light directly onto the retina, and/or light-field technologies that project light rays directly into the eye.

In one embodiment, a head-mounted display (HMD) is configured to be dismantled automatically from the head of a passenger who travels in an automated on-road vehicle. The HMD includes at least a display module, a mount, and a lock. The display module is configured to project video into the passenger's eyes. The mount includes a flexible piece and a stiff piece (referred to as "pieces") connected by the lock. The mount is configured to attach the display module to the passenger's head while the pieces are connected. Responsive to receiving an indication of an imminent collision involving the automated on-road vehicle, the lock is configured to disconnect the pieces (referred to as "disconnection"), such that the flexible piece stays on the head shortly after the disconnection, and the stiff piece is removed from the head shortly after the disconnection.

There may be various options and/or configurations for the flexible and/or stiff pieces in embodiments described herein. In one example, the flexible piece is in direct physical contact with the passenger's face, and the stiff piece holds the display module and is not in direct physical contact with the passenger's face. In another example, the flexible piece is disposable and in physical contact with the passenger's face, and the stiff piece is not disposable and is not in physical contact with the passenger's face. In yet another example, the disconnection enables fast removal of the HMD from the passenger's head before the imminent collision.

In another embodiment, an HMD is configured to be dismantled automatically from the head of a passenger traveling in an automated on-road vehicle. The HMD includes at least a display module, a mount, and a lock. The mount includes a flexible piece and a stiff piece (referred to as "pieces") connected by the lock. The mount is configured to attach the display module to the passenger's head while the pieces are connected. And the lock is configured to disconnect the pieces, responsive to receiving an indication indicative of an imminent collision involving the automated on-road vehicle, such that the stiff piece is removed from the passenger's head before the collision. Optionally, the flexible piece remains on the passenger's head after the lock disconnects the pieces and before the collision. Optionally, the flexible piece is in direct physical contact with the passenger's face, and the stiff piece holds the display module and is not in direct physical contact with the passenger's face. Optionally, the flexible piece is a disposable hygienic layer configured to prevent direct physical contact of the stiff piece with the passenger's face while the passenger wears the HMD. Optionally, the flexible piece is configured to cushion pressure of the stiff piece on the passenger's face while wearing the HMD. Optionally, the flexible piece comprises an element made of at least one of: a foam, rubber, silicon, and a shock absorbing material.

In one embodiment, the HMD is wired to an actuator fixed to a cabin of the automated on-road vehicle. After disconnecting the pieces, the actuator is configured to pull, from the passenger's head, the stiff piece together with the display module, and to secure the stiff piece and the display module in order to prevent it from being thrown inside the cabin during the collision.

In an alternative embodiment, the HMD is a wireless HMD, the lock is physically coupled to the wireless HMD, and disconnecting the pieces pushes the stiff piece off the passenger's head. In one example, after disconnecting the pieces, the stiff piece together with at least a portion of the display module falls off the passenger's head by gravity. In another example, disconnecting the pieces is achieved by releasing energy (such as releasing a spring, applying electromagnet repulsion force, and/or using a flammable material such as a combustible and/or explosive material). This energy pushes away the stiff piece, together with at least a portion of the display module, off the passenger's head.

There are various possible embodiments for the lock. In one embodiment, the HMD is unusable after disconnecting the pieces. In another embodiment, the lock is a disposable lock that needs to be replaced after disconnecting the pieces. And in still another embodiment, the lock is a reusable lock that can be used again after disconnecting the pieces. The following are example of possible implementations for the lock that holds and disconnects the at least two pieces of the mount.

In one example, the lock that connects and disconnects the pieces is based on a permanent electromagnetic holder. When the power is off the magnet holds the pieces, and when the current is turned on the magnetism is neutralized, allowing the connection to be released.

In another example, the lock that connects and disconnects the pieces is based on a solenoid lock. A solenoid lock usually includes a coil of copper wire with an armature (that is a slug of metal) in the middle. When the solenoid coil is not energized (and does not consume power), the pieces are connected together by the solenoid slug that prevents their separation. When the coil is energized, the slug is pulled into the center of the coil, and the pieces can be disconnected because the solenoid slug does not prevent their separation.

In still another example, the lock that connects and disconnects the pieces is based on an electromagnetic lock. In this example, the pieces of the mount may include an electromagnet and an armature plate. In one embodiment, the electromagnets are attached to the display module while the mating armature plates are attached to straps that are part of the mount. The electromagnet and the armature plate are in contact when the straps are connected to the display module. When the electromagnet is on, a current passing through the electromagnet causes the armature plate to attract to the electromagnet, creating a locking action. When the electromagnet is off, the armature plate is not attracted to the electromagnet, and the display module is disconnected from the straps. It is noted that although most of the examples related to possible implementations of the lock are given with reference a mount that includes straps, most of these examples are also relevant to a mount that does not include straps, such as the stiff mount of Microsoft® Hololens™ augmented reality headset.

In still another example, the lock includes a motor configured to move over a rail. The rail includes at least first and second parts. The first part is attached to the display module while the second part is attached to straps. When the motor is on the rail, the first and second parts cannot be separated because the motor holds them. When the motor moves and falls off the rail, there is nothing to hold the first and second parts together, and thus the display module is disconnected from the straps.

In still another example, the lock includes an explosive material that disconnects the at least two pieces (such as the flexible piece and the stiff piece), and thus the display module is disconnected from the straps. In an alternative configuration, the lock is configured to disconnect a portion of the display module from a portion of the mount, responsive to receiving the indication of an imminent collision involving the automated on-road vehicle; here, the detonation of the explosive material causes the portion of the display module to be removed from the passenger's head before the collision, while the detonation of the explosive material does not cause the portion of the mount to be removed from the passenger's head before the collision.

Figure 3A:
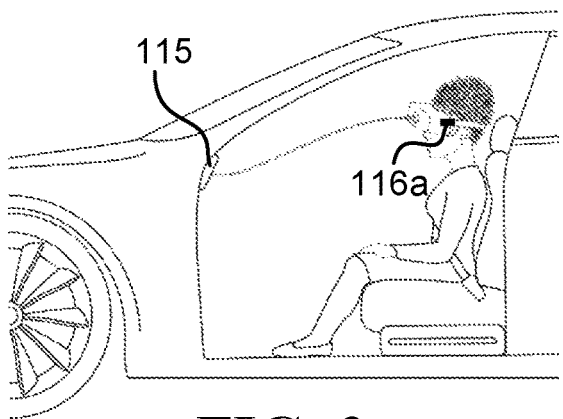
FIG. 3a to FIG. 3d illustrate one embodiment in which an HMD worn by a passenger in a vehicle is dismantled and its display module is stored near the dashboard.
Figure 3B:
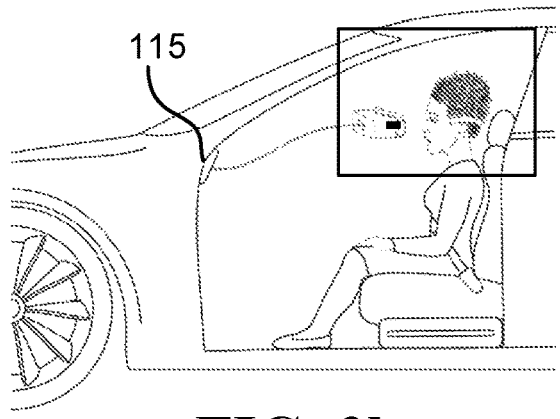
Figure 3C:
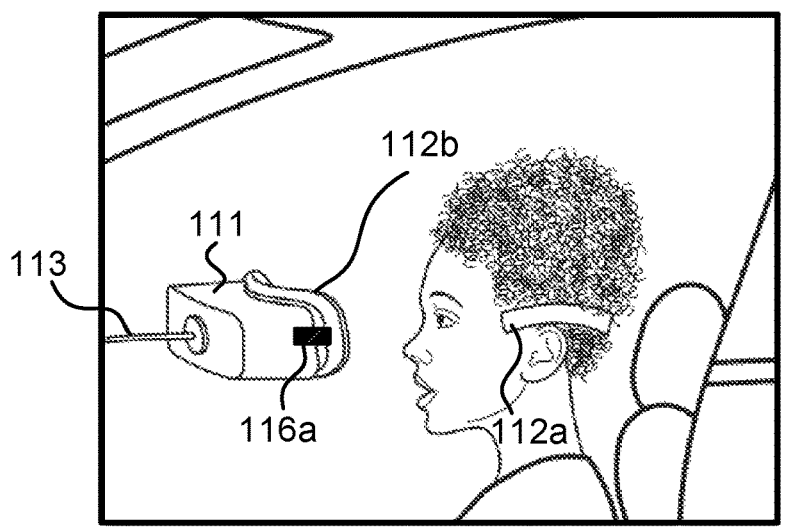

The lock that connects and disconnects the at least two pieces of the mount may be located in various places over the HMD, as described in the following examples:

In one example, the HMD is mounted on the head using straps, and the lock connects the straps to a structure that is part of the display module. After the lock disconnects the straps from the display module, the display module can be easily removed from the head. For example, FIG. 3c illustrates lock 116a that is disconnected from the strap 112a.

Figure 5:
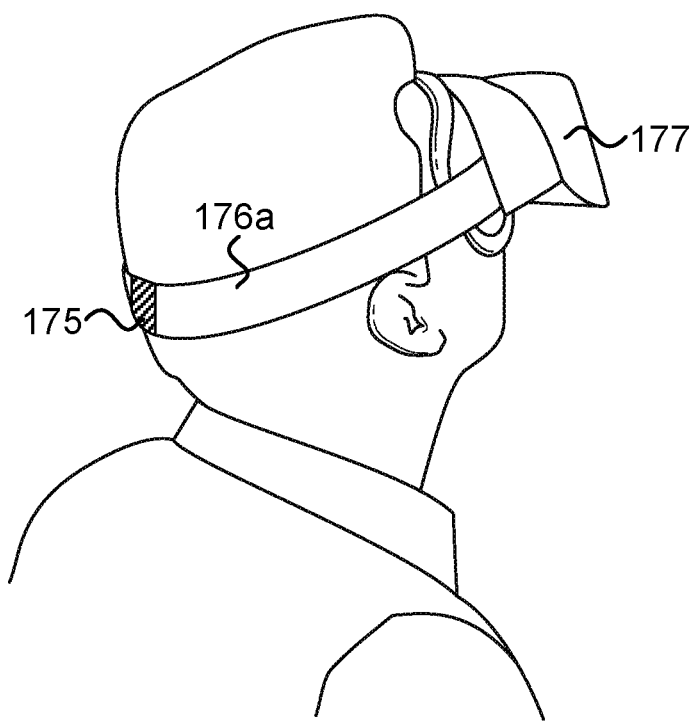
FIG. 5 illustrates one example of a position for a lock configured to quickly dismantling a VR headset strap from behind the head.

In another example, the HMD is mounted on the head using at least two straps, and the lock connects the at least two straps. After the lock disconnects the connection between the straps, the HMD can be easily removed from the head. For example, FIG. 5 illustrates lock 175 that is configured to disconnect the right strap 176a from the left strap (not illustrated in the figure); after disconnecting the straps, the HMD 177 can be easily removed from the head.

Figure 4A:
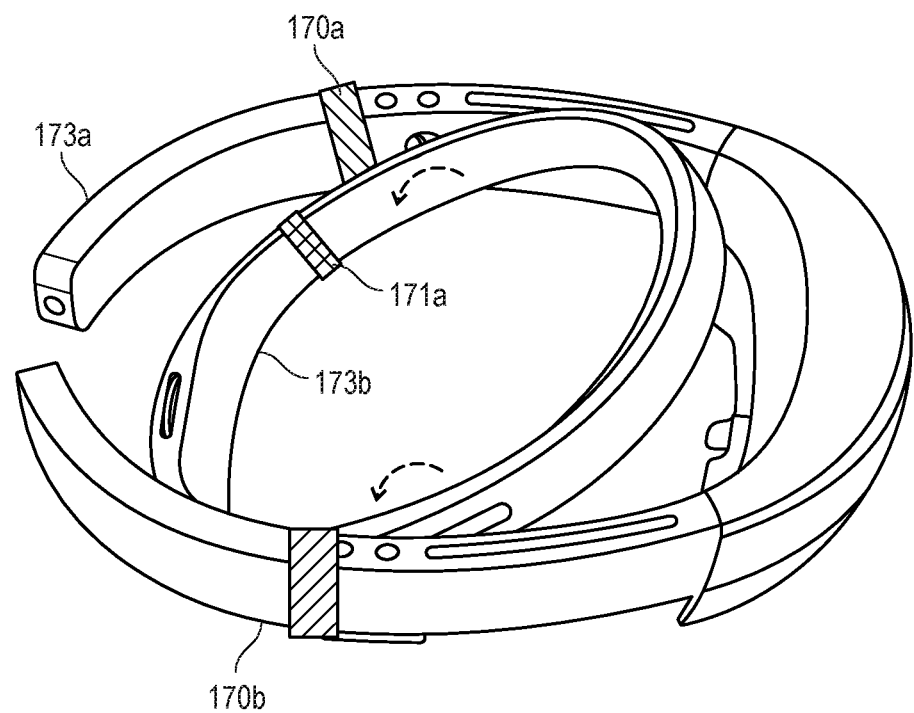
FIG. 4a illustrates one example of locks positions for quickly dismantling a Microsoft® Hololens™ augmented reality headset.
Figure 4B:
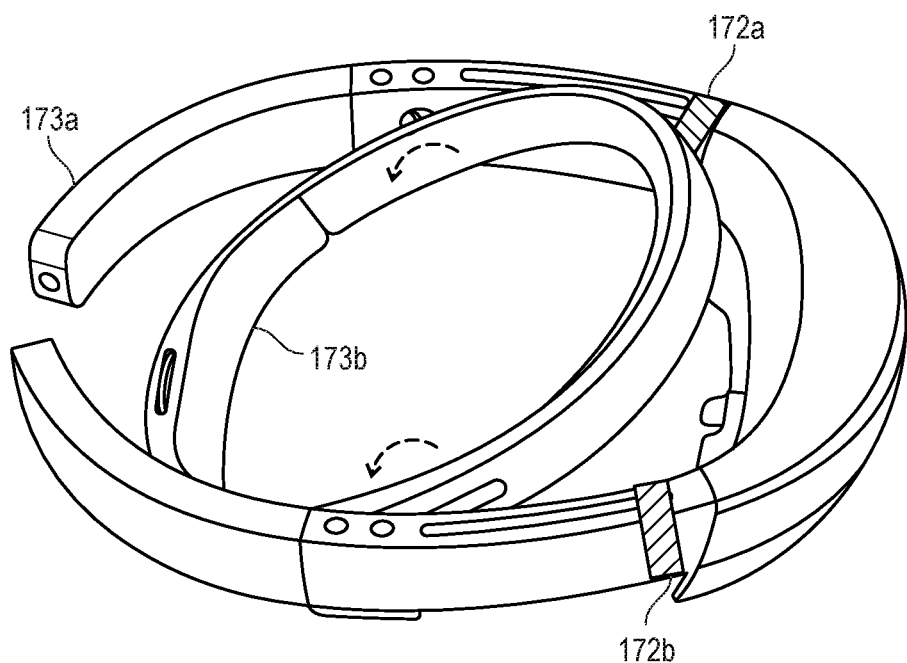
FIG. 4b illustrates Microsoft® Hololens™ augmented reality headset as an example of an HMD that includes a mount configured to surround the passenger's head.

In still another example, the HMD is mounted on the head using at least one headband, and the lock connects at least two parts of the headband. FIG. 4a illustrates one example of possible locations for four locks that can quickly dismantle Microsoft® Hololens™ augmented reality headset. The mount in Microsoft® Hololens™ includes a headband and a visor. Locks 170a and 170b are configured to connect and disconnect the front and back pieces of the visor. Lock 171a, together with the right lock (that is hidden in the figure), are configured to connect and disconnects the upper and lower pieces of the headband. After the locks disconnect the connections between the pieces of the headband and the visor, the HMD can be easily removed from the head. FIG. 4b illustrates alternative locations for the locks (172a, 172b); these alternative locations are suitable for releasing the front piece from the two mounts that surround the passenger's head.

The display module includes electronics and usually also optics, configured to project video into the passenger's eyes. The electronics and optics are fixed to the head by the mount. In one embodiment, the mount includes a stiff piece that protects the electronics and optics from being damaged during normal usage conditions. For example, in Oculus Rift the stiff piece includes the outer shell that covers and protects the electronics and optics from being damaged.

The following is a description of illustrations of examples of different embodiments of systems configured to dismantle a head-mounted display (HMD) from a passenger's head.

Figure 2A:
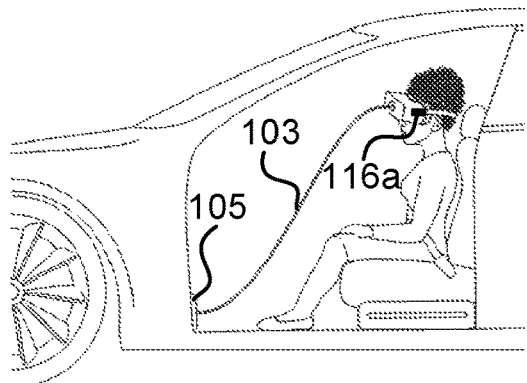
FIG. 2a to FIG. 2d illustrate one embodiment in which an HMD worn by a passenger in a vehicle is dismantled and its display module is stored near the floor of the vehicle.
Figure 2B:
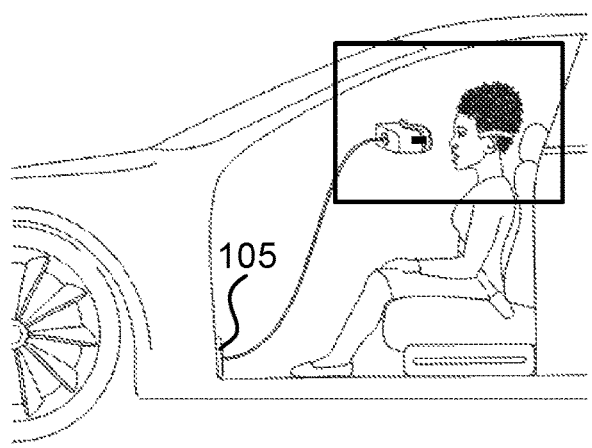
Figure 2C:
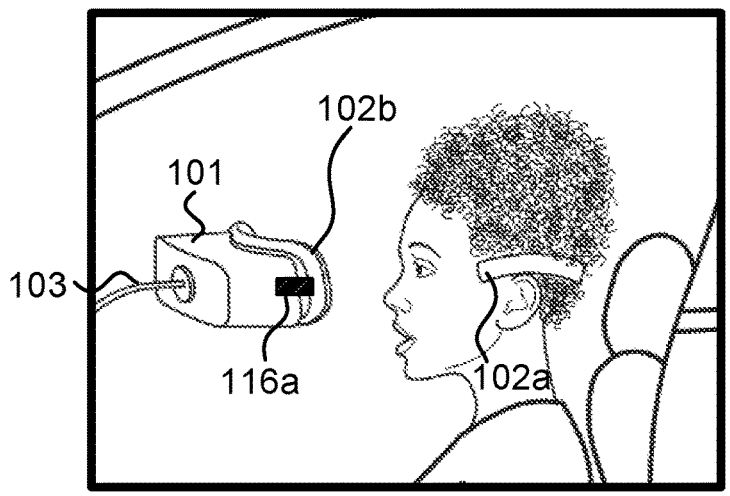

FIG. 2a to FIG. 2d illustrate a system in which actuator 105 is connected by cable 103 to HMD worn by a passenger. The HMD comprises a display module 101 and a mount that includes two pieces: a strap 102a and a face piece 102b that is attached to the display module 101. At least part of the face piece 102b comes into physical contact with the passenger's face, while the display module 101 does not come into direct physical contact with the passengers' face. FIG. 2b illustrates a removal of the HMD from the passenger's head after receiving an indication (e.g., of an imminent collision of the vehicle). The removal is achieved by disassembling the HMD, by having the lock 116a disconnect the two pieces of the mount (that are in this case the face piece 102b and the strap 102a). FIG. 2c illustrates a magnification of a region of FIG. 2b, which illustrates the strap 102a being separated from the display module 101 and face piece 102b. The display module 101 and face piece 102b may be pulled by cord 103, which is part of the actuator 105. In this illustration, the strap 102a may remain on the passenger's head, while the display module 101 and the face piece 102b do not. In one example, the display module 101 may include optics and/or components of an electronic display module used to present images to the passenger, and the face piece 102b may include flexible and/or soft material that makes wearing the HMD comfortable for the passenger.

Figure 2D:
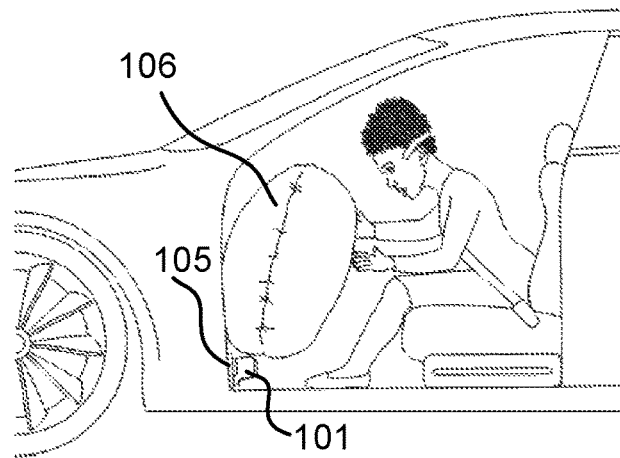

FIG. 2d illustrates how the display module 101 is stowed near the floor, placing it underneath airbag 106, which was deployed due to the collision. By keeping the display module 101 out of the way of the deployed airbag 106, the system reduces the chance that the passenger may be injured due to an impact involving the HMD. For example, if the HMD is not detached from the face, when the airbag 106 inflates, the impact between airbag 106 and HMD can increase the passenger's injuries. In another example, even if the HMD is detached, if the HMD, or parts of the HMD, remain loose in the cabin, they can hit the passenger during a collision and/or be propelled towards the passenger by an inflating airbag. In still another example, wearing the HMD during collision can cause a whiplash because of the extra weight of the HMD that is added to the head.

Figure 3D:
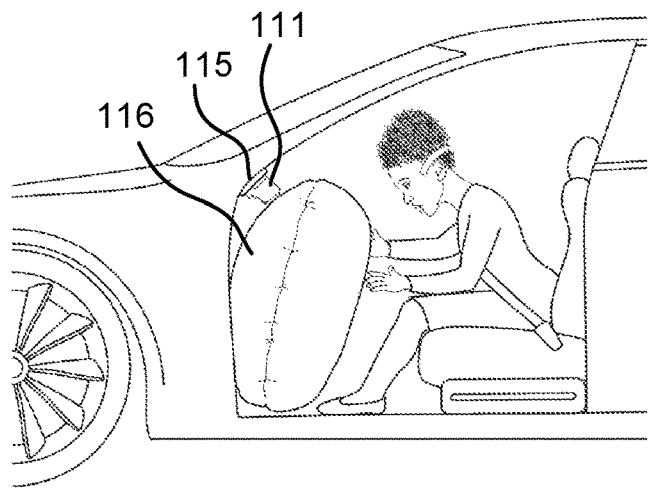

FIG. 2a to FIG. 2d illustrate removing at least part of the HMD, such that the display module 101 is stowed near the floor below the airbag 106, in a position in which it is not in the path of the inflating airbag (when the airbag 106 is inflated). The display module may be detached and stowed in other locations. For example, FIG. 3a to FIG. 3d illustrate a system in which actuator 115 is connected to an HMD that is worn by a passenger, and the actuator 115 is located on the dashboard of the vehicle (e.g., at face or torso level). The HMD comprises a display module 111 and a mount. The mount includes two pieces that are connected by lock 116a: a strap 112a and a face piece 112b that is attached to the display module 111. FIG. 3b illustrates a removal of the display module 111 and face piece 112b from the passenger's head after receiving an indication (e.g., an indication of an imminent collision of the vehicle). FIG. 3c illustrates a magnification of a region of FIG. 3b, which illustrates the strap 112a being separated from the display module 111 and face piece 112b (which is attached to the display module 111). The display module 111 and face piece 112b may be pulled by cord 113, which is part of the actuator 115. FIG. 3d illustrates how when the display module 111 is pulled to the dashboard, it is placed beyond the airbag 116, which was deployed due to the collision. By keeping the display module 111 out of the way of the deployed airbag 116, the system reduces the chance that the passenger may be injured due to an impact involving the display module 111 of the HMD.

Figure 1B:
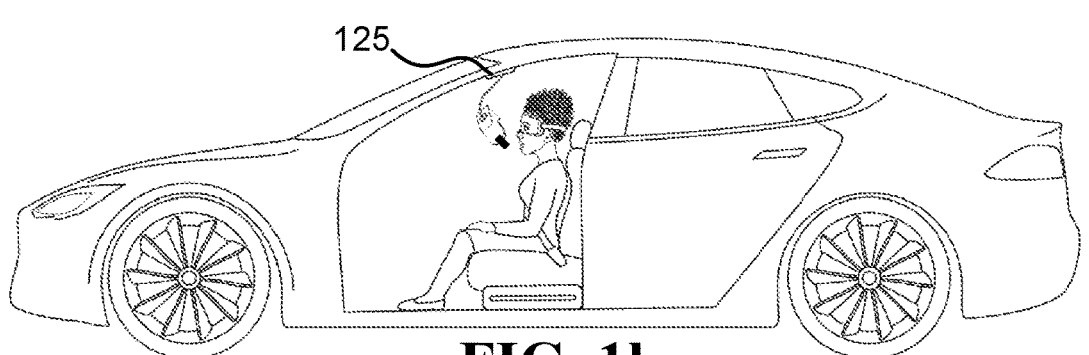
Figure 1C:
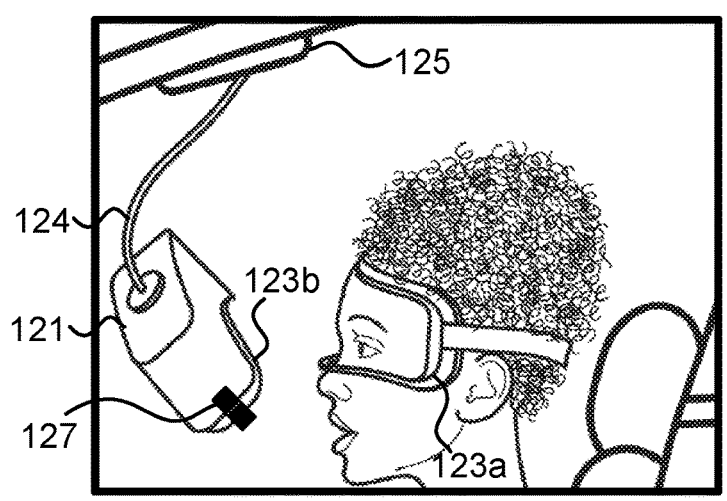
Figure 1D:
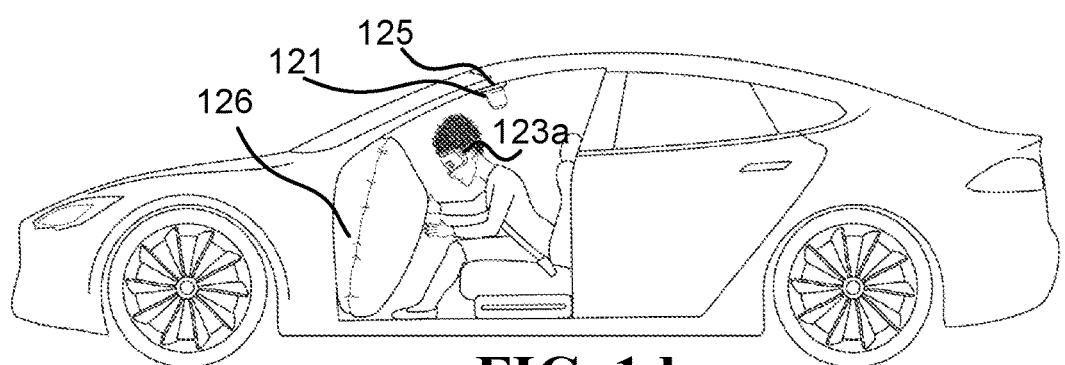

FIG. 1a to FIG. 1d illustrate another example of a system in which an HMD may be dismantled automatically. Actuator 125 is connected to an HMD that is worn by a passenger, and the actuator 125 is located on the ceiling the vehicle. The HMD comprises a display module 121 and mount that comprises a personal (interchangeable) face piece 123a that is connected (by the lock 127) to a piece 123b that is attached to the display module 121. The face piece 123a comes into contact with the face, while the piece 123b does not come into physical contact with the passenger's face, optionally in order to keep the HMD hygienic. FIG. 1b illustrates a removal of the display module 121 (and piece 123b) from the passenger's head after receiving an indication (e.g., an indication of an imminent collision of the vehicle). FIG. 1c illustrates a magnification of a region of FIG. 1b, which illustrates the face piece 123a being separated from the display module 121 and piece 123b after the lock 127 disconnected the mount pieces (123a and 123b in this example). The display module 121 and piece 123b may be pulled by cord 124, which is part of the actuator 115. In this illustration, the face piece 123a remains on the passenger's head, while the display module 121 and piece 123b are pulled to the roof of the vehicle. FIG. 1d illustrates how when the display module 121 is pulled to the roof, it is placed above the airbag 126, which was deployed due to the collision. By keeping the display module 121 out of the way, the passenger is not expected to hit the display module 121 and/or be injured by it due to body movement caused by the collision, and/or due to the extra weight that the HMD applies to the head.

In one embodiment, an HMD is configured to be dismantled automatically before a collision. The HMD includes a mount, a display module, and a lock. The mount is configured to surround the head of a passenger who travels in an automated on-road vehicle. FIG. 4b illustrates Microsoft® Hololens™ augmented reality headset as an example of an HMD that includes a mount (173a, 173b) configured to surround the passenger's head. The inner mount 173b completely surrounds the passenger's head. And because the outer mount 173a almost surrounds the passenger's head, it is also considered herein as a mount that is configured to surround the passenger's head.

The display module is configured to project video into the passenger's eyes. The lock is configured to attach the display module to the mount. The lock disconnects a portion of the display module from a portion of the mount, responsive to receiving an indication of an imminent collision involving the automated on-road vehicle, such that the portion of the display module is removed from the passenger's head before the collision, and the portion of the mount is not removed from the passenger's head before the collision. Additionally or alternatively, the lock is configured to disconnect a portion of the display module from a portion of the mount, responsive to receiving an indication of an imminent collision involving the automated on-road vehicle; and disconnecting the portion of the display module from the portion of the mount involves removing the portion of the display module from the passenger's head before the collision, and not removing the portion of the mount from the passenger's head before the collision.

Optionally, the HMD further includes an actuator fixed to the vehicle. The actuator is powered by a motor and is configured to remove the portion of the display module from the passenger's head upon receiving the indication. Optionally, the actuator includes at least one cord and at least one winder; the at least one cord is connected at one side to the at least one winder and is connected at the other side to the HMD; wherein the motor is configured to rotate the winder in one direction to spool the cord. Optionally, the motor is configured to rotate the winder in the opposite direction to unspool the cord, the cord is configured to transmit to the HMD power from a power source and video signals from a computer; and wherein the power source and the computer are fixed to the vehicle. In one example, the winder is an electric wire winder having a winding reel and a motor for rolling the reel. The speed of rolling the reel may be measured by a rotary encoder or by other methods known in the art.

Alternatively, the HMD further includes a wireless receiver configured to receive at least most of the video data to be presented to the passenger over a wireless channel, and the cord is configured to secure the HMD from hitting the passenger during collision. In one example, the winder is an electric wire winder having a winding reel and a motor for rolling the reel. The speed of rolling the reel may be measured by a rotary encoder or by other methods known in the art. Optionally, the actuator comprises at least one cord and at least one rail, and the motor is configured to move over the rail; and wherein the at least one cord is connected at one side to the motor and at the other side to the HMD. Optionally, the motor is a step motor and the rail has grooves suited for the step motor. Alternatively, the motor is a linear motor, and further comprising a motor encoder to control the position of the motor on the rail. In one example, the rail is located along the roof, along the side anti-intrusion bar/beam around a side door, along the dashboard, inside the dashboard towards the bonnet, and/or along the passenger's seat. The rail may be straight or curved (as long as the motor is able to run over the curved rail).

The following is a description of illustrations of examples of different embodiments of systems configured to remove a head-mounted display (HMD) from a passenger's head.

Figure 6A:
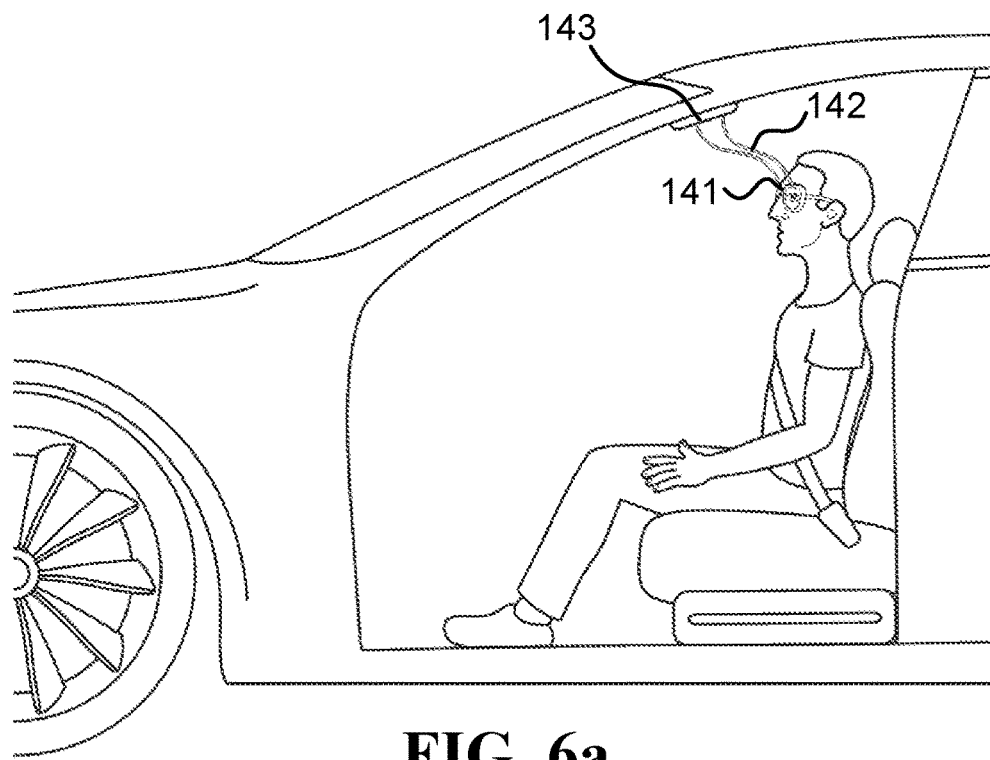
FIG. 6a and FIG. 6b illustrate one embodiment in which smart glasses are removed from the head of a passenger.
Figure 6B:
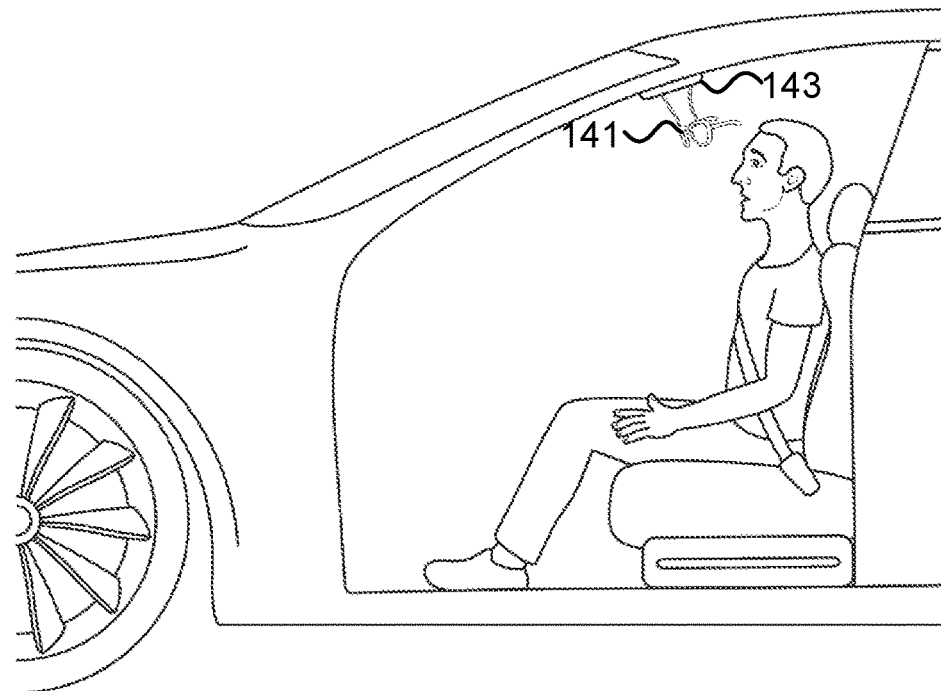
Figure 7A:
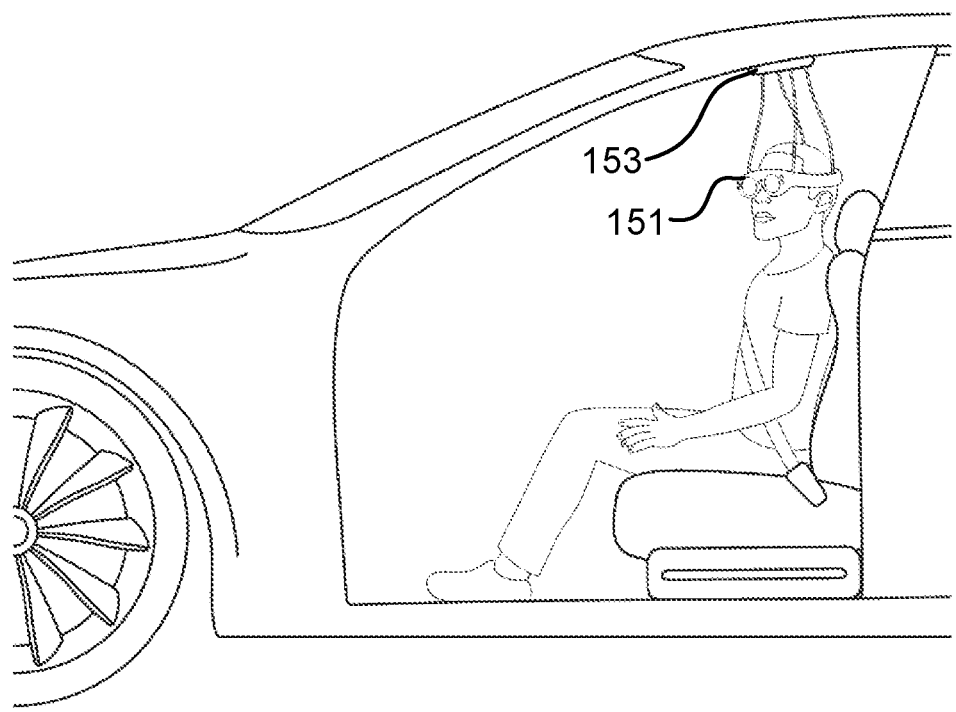
FIG. 7a and FIG. 7b illustrate one embodiment in which an augmented reality HMD is removed from the head of a passenger.
Figure 7B:
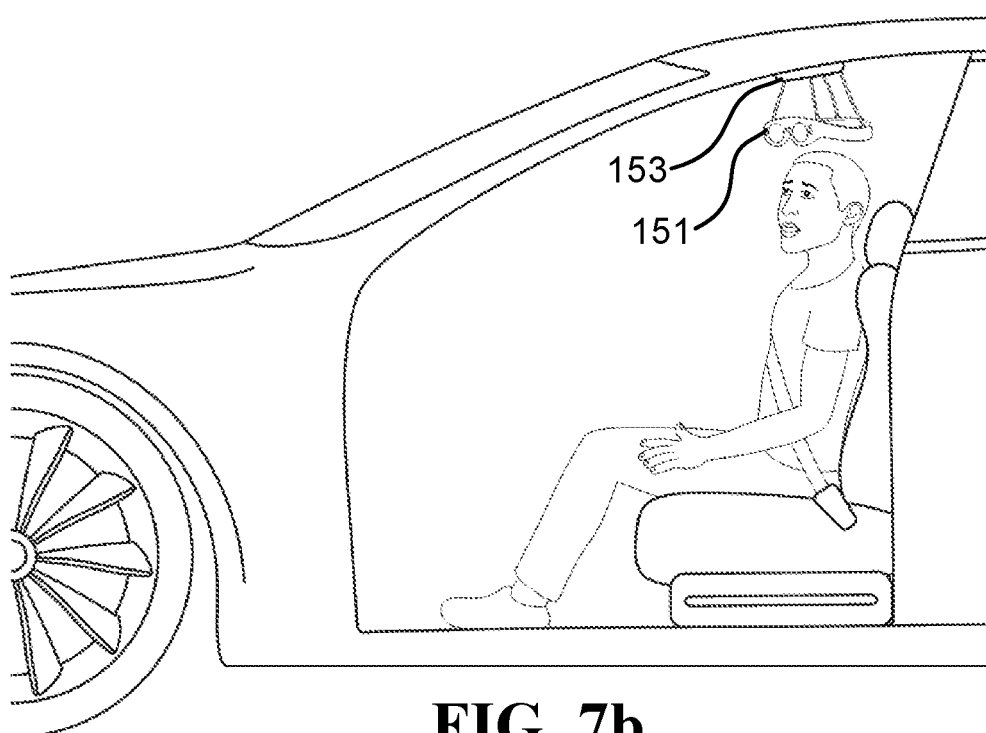

FIG. 6a illustrates a passenger sitting in a vehicle, wearing smart glasses 141. The smart glasses 141 are connected to actuator 143 through flexible cords 142 that may be wound or released. Upon receiving an indication (e.g., due to an imminent collision involving the vehicle), the actuator 143 remove the smart glasses from the passenger's face, as illustrated in FIG. 6b. FIG. 6a and FIG. 6b illustrate one embodiment in which the HMD (smart glasses 141) is removed from the head in the direction of the top of the vehicle, so upon a collision the passenger will not come in contact with the HMD. In other embodiments, the HMD may be removed in other directions (e.g., the side of the vehicle) and/or be removed by other types of actuators, such as a robotic arm. FIG. 7a and FIG. 7b illustrate another example in which a different HMD, augmented reality device 151, is removed from the head in the upward direction using actuator 153.

In one example, the actuator comprises a robotic arm and a flexible cord; the robotic arm is connected at one side to the vehicle and at the other side to the flexible cord that is connected to the HMD. Wherein the robotic arm is configured to remove the HMD from the passenger's head upon receiving the indication. Optionally, the robotic arm is further configured to move in coordination with movements of the passenger's head while the passenger is wearing the HMD. The term "robotic arm" refers herein to any type of a robot manipulator. Current robotic arms are not sensitive and responsive enough to move smoothly and in full synchronization with the passenger's head while traveling in an automated on-road vehicle. However, the combination of a robotic arm that is connected to the HMD through a flexible cord enables a smooth and synchronized movement with the passenger's head, because in this configuration the robotic arm has to respond just to the gross movements of the passenger's head, while the flexible cord passively responds to the fine movements of the passenger's head. The combination of a robotic arm that is connected to the HMD through one or more flexible cords has the advantage that there is no need to wind long cords, and therefore may be more robust in certain circumstances.

In one example, the actuator comprises a robotic arm and at least two-axes gimbals. The robotic arm is connected at one side to the vehicle and at the other side to at least 2 axis gimbals that is connected to the HMD. Wherein the robotic arm together with the at least two-axes gimbals are configured to move in coordination with movements of the passenger's head while the passenger is wearing the HMD, and to remove the HMD from the passenger's head upon receiving the indication.

In one example, the vehicle further includes an imaging device configured to detect whether at least one of the passenger's hands are in the way of removing the HMD from the passenger's head, and the system is further configured to alert the passenger to move a hand if necessary.

In another example, the vehicle further includes an imaging device configured to detect whether at least one of the passenger's hands are in the way of removing the HMD from the passenger's head, and the system is further configured to remove the HMD from the passenger's head slower that it would have removed the HMD from the passenger's head had the passenger's hands were not in the direction of removing the HMD.

In one embodiment, a safety system includes an HMD, a folded airbag, and an inflation system. The HMD is configured to be worn on a passenger's head while traveling in an automated on-road vehicle. The folded airbag is fixed to the HMD. And the inflation system is configured to inflate the airbag responsive to receiving an indication indicative of an imminent collision involving the automated on-road vehicle. There may be various options and/or configurations for this safety system. Optionally, the inflation system is fixed to the vehicle, and connected to the folded airbag through a flexible hose configured to convey gas generated by the inflation system. Alternatively, the inflation system is fixed to the HMD. Optionally, the inflated airbag is located between the HMD and the compartment; whereby the inflated airbag is configured to absorb some of the energy of the head hitting the compartment. Optionally, the HMD comprises a rigid housing configured to hold the optics and the display in a fixed position relative to each other, and a flexible housing located around at least some of the rigid housing; wherein the flexible housing is configured to absorb some of the energy of the head hitting the rigid housing during collision. Optionally, the inflated airbag is located between the head and the HMD; whereby the inflated airbag is configured to absorb some of the energy of the head hitting the compartment.

Figure 8A:
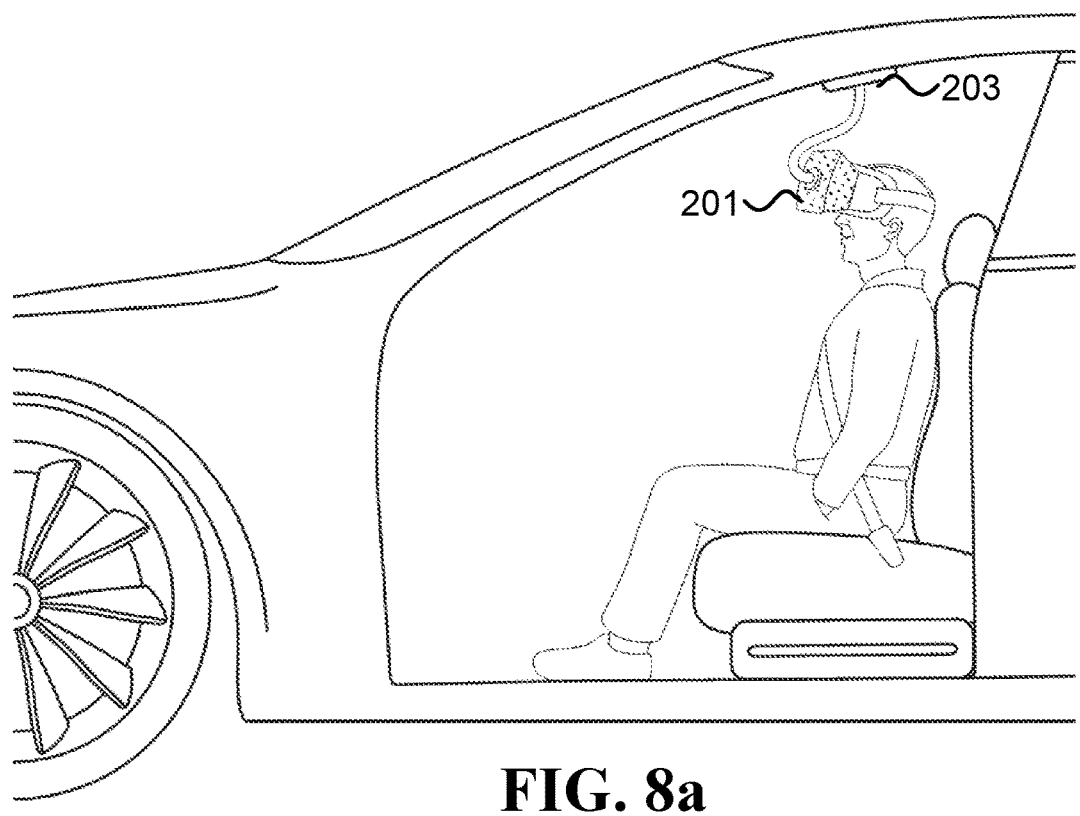
FIG. 8a to FIG. 8d illustrates various systems that include an HMD with airbags that inflate via a tube connected to an inflation system, in which the tube remains connected following the inflation.
Figure 8B:
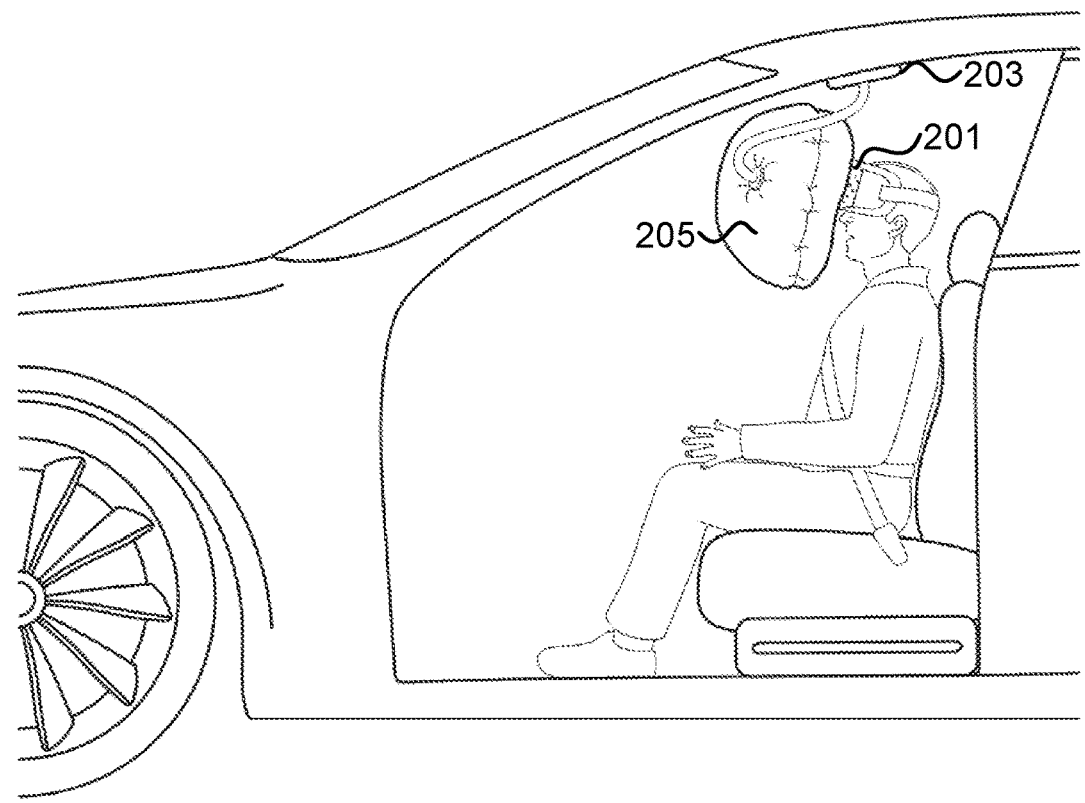
Figure 8C:
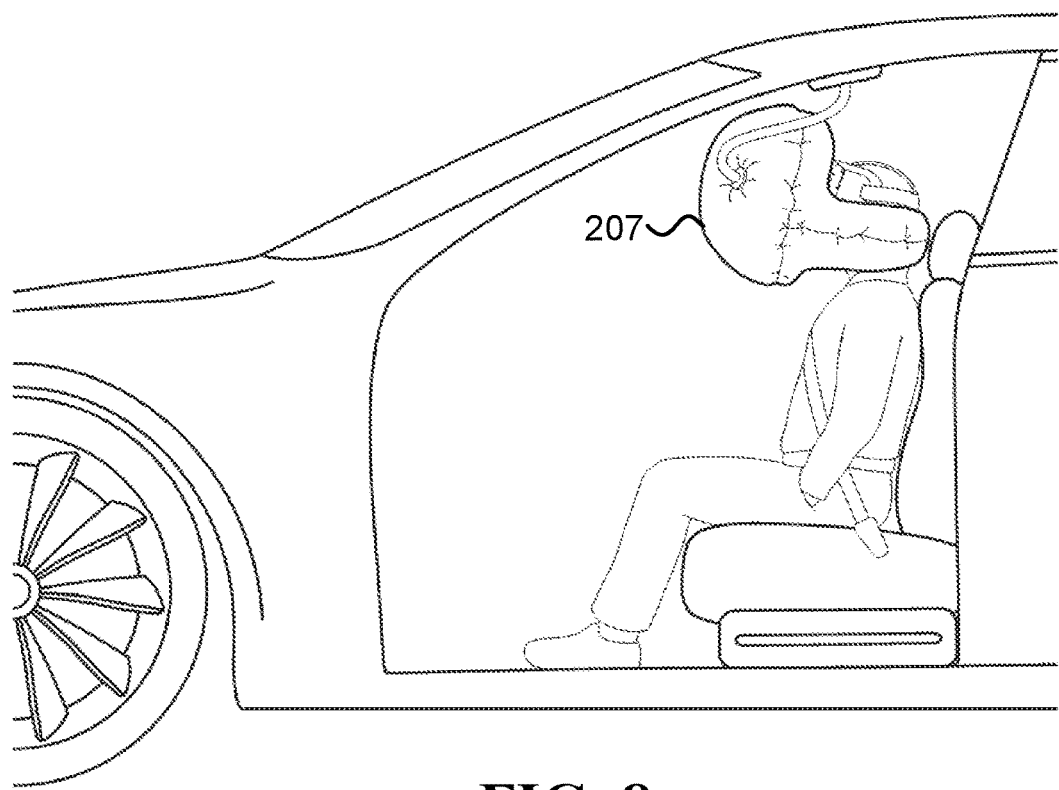
Figure 8D:
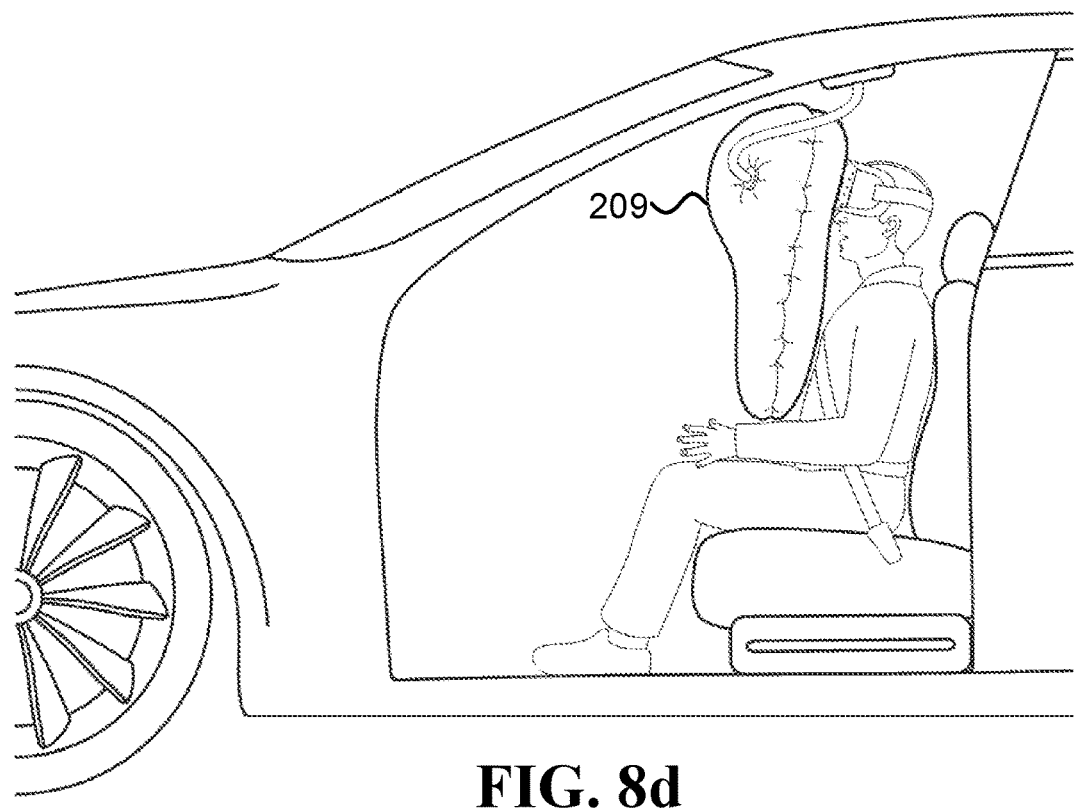

FIG. 8a illustrates a system that includes an HMD 201 connected to an inflation system 203. The HMD may have various types of airbags fixed to it, which are folded during regular driving. Upon receiving an indication, inflation system 203 inflates the airbag fixed to the HMD 201. FIG. 8b illustrates inflation of airbag 205, which is a frontal airbag. FIG. 8c illustrates inflation of airbag 207, which is an airbag that inflates in front of the face and towards the sides of the head. FIG. 8d illustrates inflation of airbag 209, which inflates in front of the face and downwards in order to protect the passenger's torso.

Figure 9A:
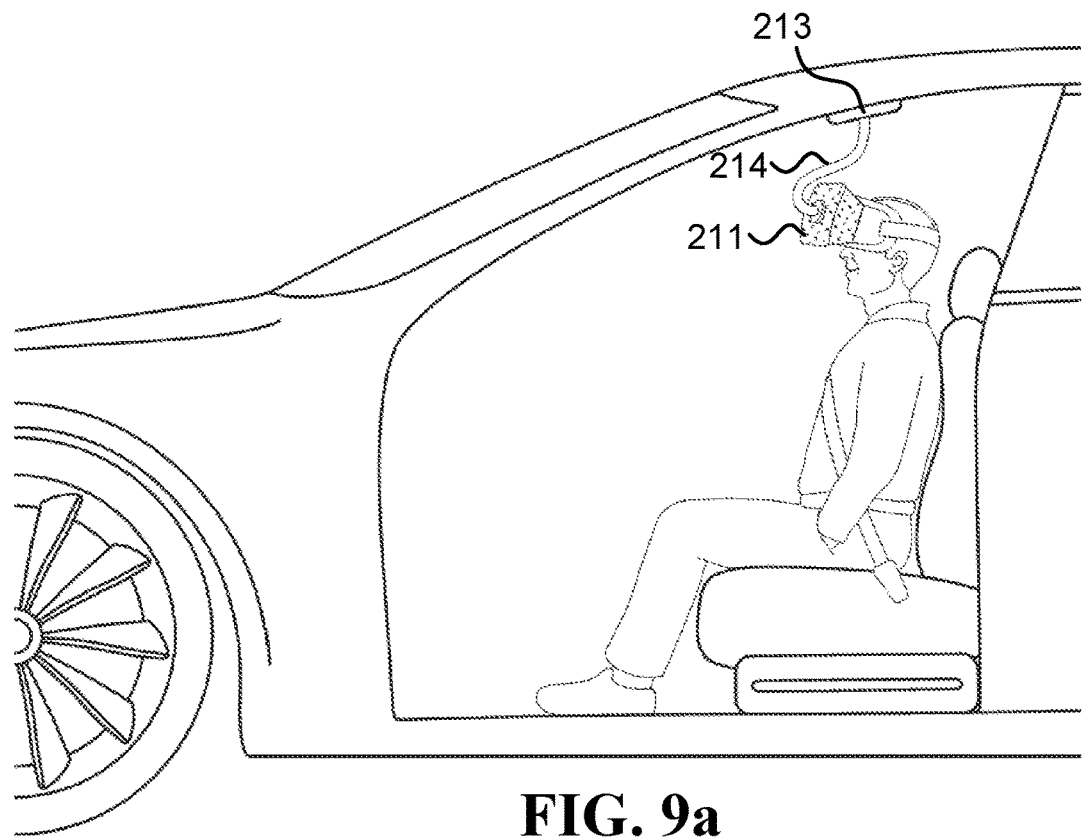
FIG. 9a to FIG. 9d illustrates various systems that include an HMD with airbags that inflate via a tube connected to an inflation system, in which the tube disconnects following the inflation.
Figure 9B:
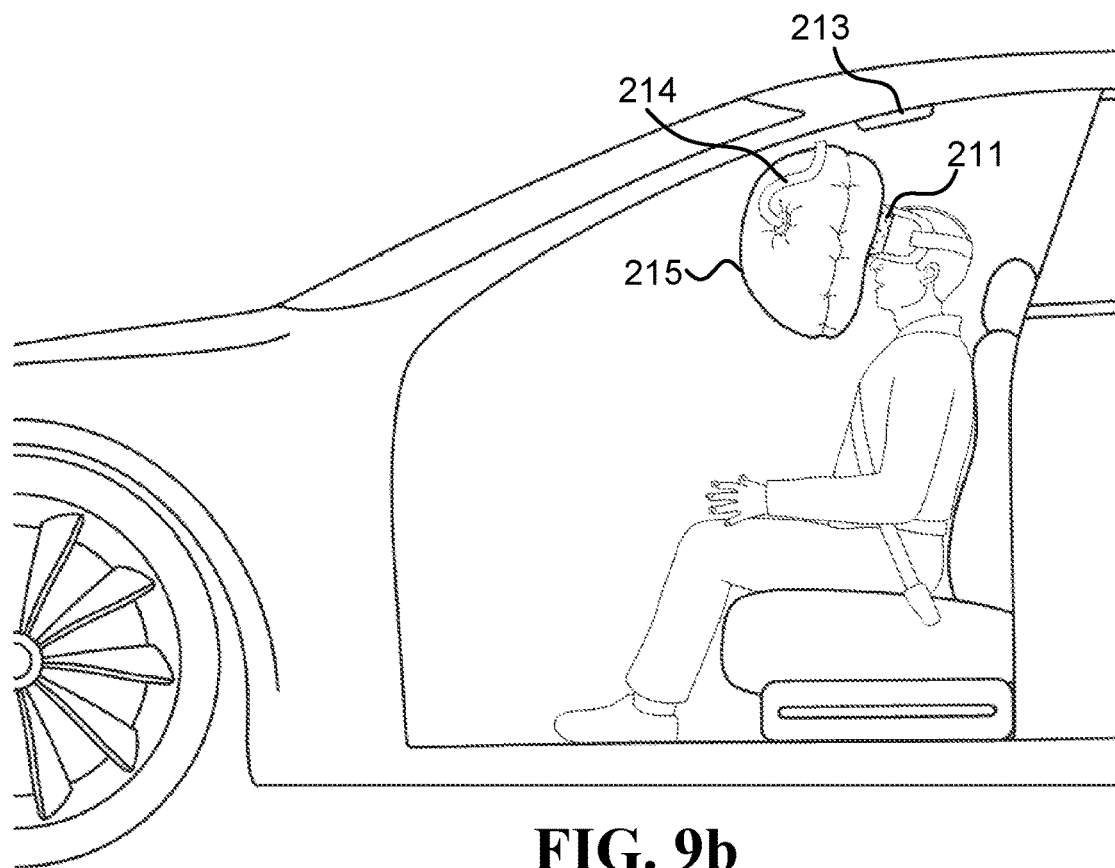
Figure 9C:
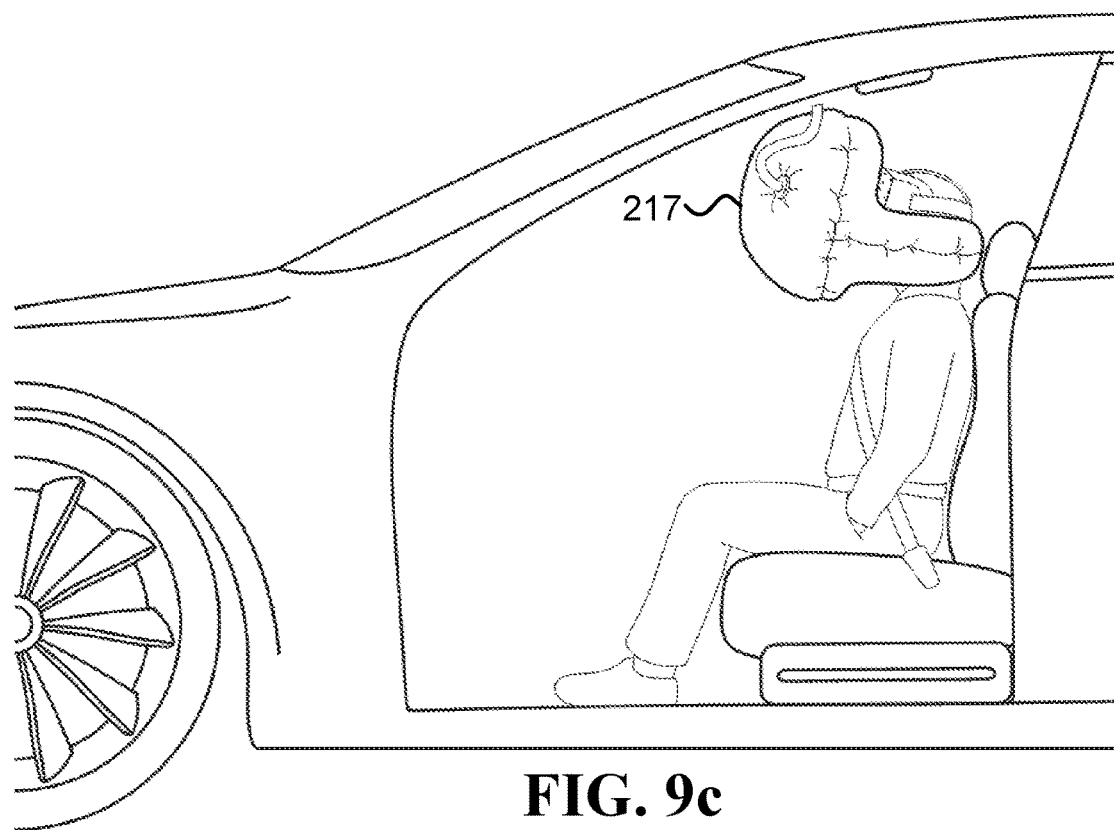
Figure 9D:
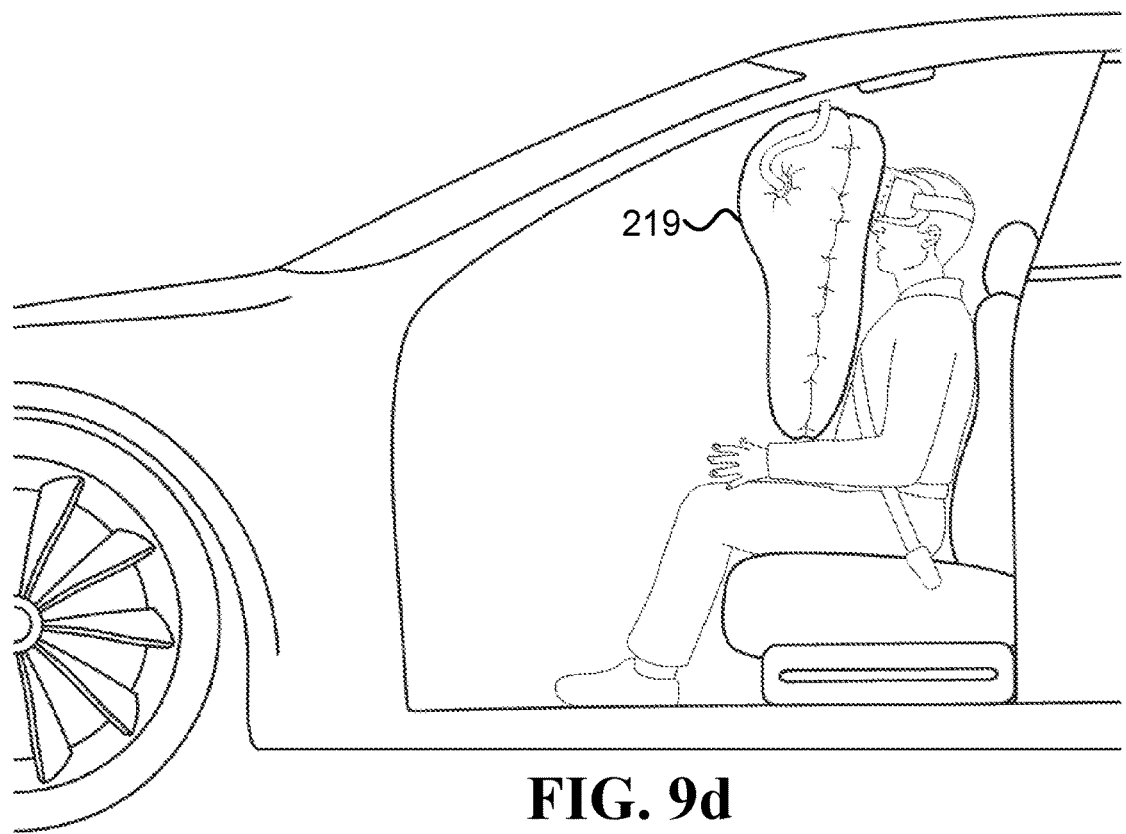

In FIG. 8a to FIG. 8d, a tube connects between the inflation system 203 and the respective airbags. In some examples, such a tube may disconnect following the inflation of the airbag. Such systems are illustrated in FIG. 9a to FIG. 9d. FIG. 9a illustrates a system that includes an HMD 211 connected to an inflation system 213 via a tube 214. The HMD may have various types of airbags fixed to it, which are folded during regular driving. Upon receiving an indication, inflation system 213 inflates an airbag fixed to the HMD 211. FIG. 9b illustrates inflation of airbag 215, which is a frontal airbag. Note that the tube 214 detaches from the inflation system 213 after inflation, such that the airbag 215 and HMD 211 are no longer connected to the top of the vehicle. FIG. 9c illustrates a similar disconnecting of the tube 214 following inflation of airbag 217, which is an airbag that inflates in front of the face and towards the sides of the head. FIG. 9d illustrates inflation of airbag 219, which inflates in front of the face and downwards in order to protect the passenger's torso.

Various embodiments described herein include a processor and/or a computer. For example, an automated driving system may be implemented using one or more computers. The following are some examples of various types of computers and/or processors that may be utilized in some of the embodiments described herein.

Figure 10A:
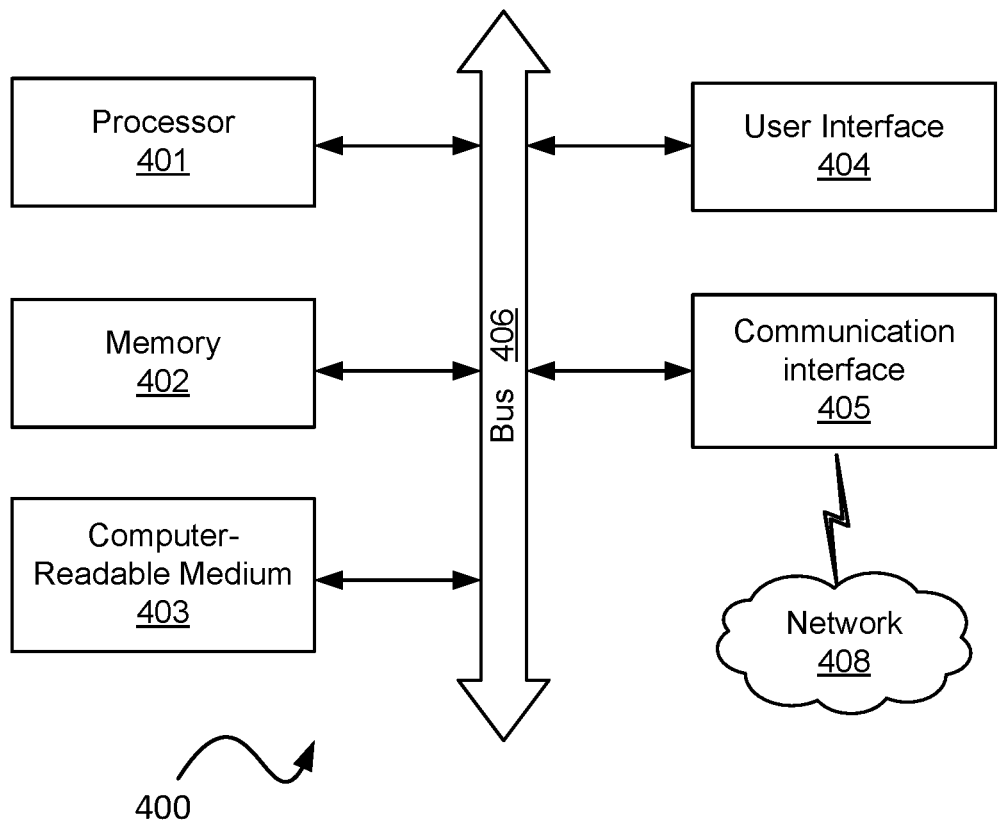
FIG. 10a and FIG. 10b are schematic illustrations of possible embodiments for computers.
Figure 10B:
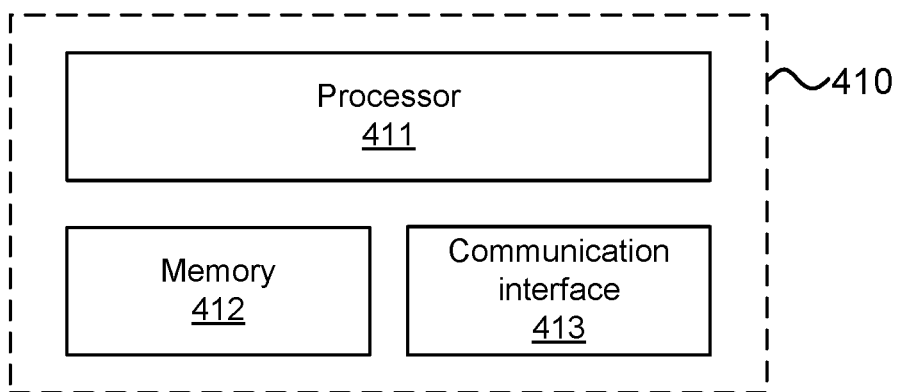

FIG. 10a and FIG. 10b are schematic illustrations of possible embodiments for computers (400, 410) that are able to realize one or more of the embodiments discussed herein. The computer (400, 410) may be implemented in various ways, such as, but not limited to, a server, a client, a personal computer, a network device, a handheld device (e.g., a smartphone), and/or any other computer form capable of executing a set of computer instructions.

The computer 400 includes one or more of the following components: processor 401, memory 402, computer readable medium 403, user interface 404, communication interface 405, and bus 406. In one example, the processor 401 may include one or more of the following components: a general-purpose processing device, a microprocessor, a central processing unit, a complex instruction set computing (CISC) microprocessor, a reduced instruction set computing (RISC) microprocessor, a very long instruction word (VLIW) microprocessor, a special-purpose processing device, an application specific integrated circuit (ASIC), a field programmable gate array (FPGA), a digital signal processor (DSP), a distributed processing entity, and/or a network processor. Continuing the example, the memory 402 may include one or more of the following memory components: CPU cache, main memory, read-only memory (ROM), dynamic random access memory (DRAM) such as synchronous DRAM (SDRAM), flash memory, static random access memory (SRAM), and/or a data storage device. The processor 401 and the one or more memory components may communicate with each other via a bus, such as bus 406. Computer 410 illustrates another possible configuration, which includes one or more of the following components: processor 411, memory 412, and communication interface 413.

Still continuing the examples, the communication interface (405,413) may include one or more components for connecting to one or more of the following: an inter-vehicle network, Ethernet, intranet, the Internet, a fiber communication network, a wired communication network, and/or a wireless communication network. Optionally, the communication interface (405,413) is used to connect with the network 408. Additionally or alternatively, the communication interface 405 may be used to connect to other networks and/or other communication interfaces. Still continuing the example, the user interface 404 may include one or more of the following components: (i) an image generation device, such as a video display, an augmented reality system, a virtual reality system, and/or a mixed reality system, (ii) an audio generation device, such as one or more speakers, (iii) an input device, such as a keyboard, a mouse, an electronic pen, a gesture based input device that may be active or passive, and/or a brain-computer interface.

It is to be noted that when a processor (computer) is disclosed in one embodiment, the scope of the embodiment is intended to also cover the use of multiple processors (computers). Additionally, in some embodiments, a processor and/or computer disclosed in an embodiment may be part of the vehicle, while in other embodiments, the processor and/or computer may be separate of the vehicle. For example, the processor and/or computer may be in a device carried by the occupant and/or remote of the vehicle (e.g., a server).

As used herein, references to "one embodiment" (and its variations) mean that the feature being referred to may be included in at least one embodiment of the invention. Moreover, separate references to "one embodiment", "some embodiments", "another embodiment", "still another embodiment", etc., may refer to the same embodiment, may illustrate different aspects of an embodiment, and/or may refer to different embodiments.

Some embodiments may be described using the verb "indicating", the adjective "indicative", and/or using variations thereof. Herein, sentences in the form of "X is indicative of Y" mean that X includes information correlated with Y, up to the case where X equals Y. Additionally, sentences in the form of "provide/receive an indication indicating whether X happened" refer herein to any indication method, including but not limited to: sending/receiving a signal when X happened and not sending/receiving a signal when X did not happen, not sending/receiving a signal when X happened and sending/receiving a signal when X did not happen, and/or sending/receiving a first signal when X happened and sending/receiving a second signal X did not happen.

Herein, "most" of something is defined herein as above 51% of the something (including 100% of the something). A "portion" of something refers herein to 5% to 100% of the something (including 100% of the something). Sentences of the form "a portion of the mount" refer to a part that captures between 5% to 100% percent of the mount. Similarly, sentences of the form "a portion of the display module" refer to a part that may include electronics and/or optics and/or casing, which captures between 5% to 100% percent of the display module.

As used herein, the terms "comprises," "comprising," "includes," "including," "has," "having", or any other variation thereof, indicate an open claim language that does not exclude additional limitations. The "a" or "an" is employed to describe one or more, and the singular also includes the plural unless it is obvious that it is meant otherwise.

Certain features of some of the embodiments, which may have been, for clarity, described in the context of separate embodiments, may also be provided in various combinations in a single embodiment. Conversely, various features of some of the embodiments, which may have been, for brevity, described in the context of a single embodiment, may also be provided separately or in any suitable sub-combination.

Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the appended claims and their equivalents.

The invention claimed is:

1. A system, comprising:
a head-mounted display (HMD) configured to be worn on a passenger's head while traveling in an automated on-road vehicle;
a folded airbag fixed to the HMD; and
an inflation system fixed to the vehicle, and connected to the folded airbag through a flexible hose configured to convey gas generated by the inflation system.

2. The system of claim 1, wherein the inflation system is configured to inflate the airbag, utilizing the conveyed gas, responsive to receiving an indication indicative of an imminent collision involving the automated on-road vehicle.

3. The system of claim 1, wherein the inflated airbag is configured to absorb some of the energy of the head hitting the compartment, the HMD comprises a rigid housing configured to hold optics and a display in a fixed position relative to each other, and a flexible housing located around at least some of the rigid housing.

4. The system of claim 3, wherein the flexible housing is configured to absorb some of the energy of the head hitting the rigid housing during collision.

5. The system of claim 1, wherein the inflated airbag is located between the head and the HMD, and the inflated airbag is configured to absorb some of the energy of the head hitting the compartment.

6. The system of claim 1, wherein the system is further configured to disconnect the flexible hose following the inflation of the airbag.

7. The system of claim 6, wherein the airbag is a frontal airbag.

8. The system of claim 6, wherein the airbag is configured to inflate in front of the head and towards the sides of the head.

9. The system of claim 6, wherein the airbag is configured to inflate in front of the head and downwards in order to protect the passenger's torso.

10. The system of claim 1, wherein the system is further configured to detach the flexible hose from the inflation system after inflation, such that the airbag is no longer connected to the inflation system shortly after the inflation.

11. The system of claim 10, wherein the airbag is a frontal airbag.

12. The system of claim 10, wherein the airbag is configured to inflate in front of the head and towards the sides of the head.

13. The system of claim 10, wherein the airbag is configured to inflate in front of the head and downwards in order to protect the passenger's torso.

* * * * *